United States Patent Office 2,837,300
Patented June 3, 1958

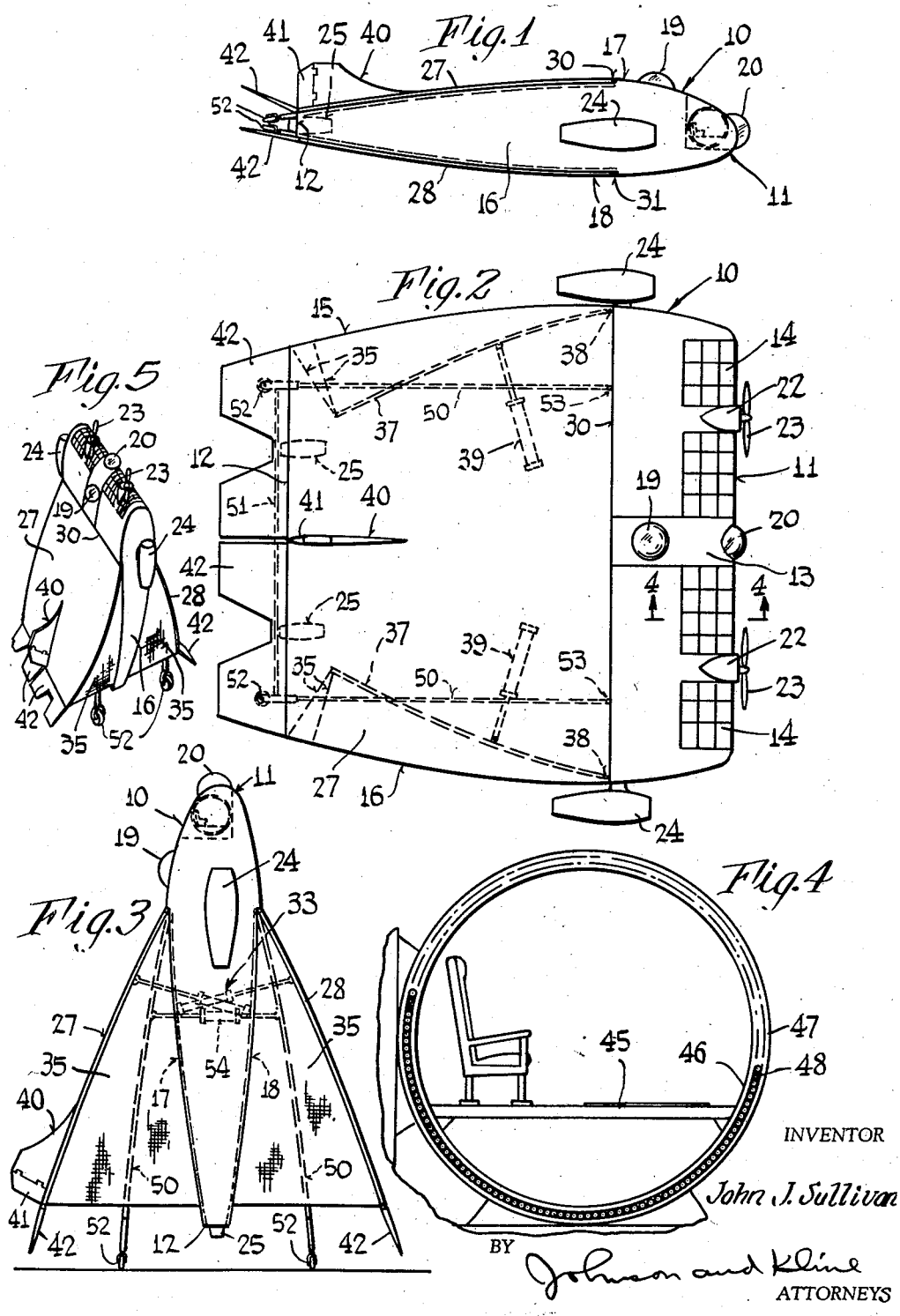

2,837,300

VERTICAL AND HORIZONTAL FLIGHT AIRCRAFT

John J. Sullivan, Norfolk, Va.

Application November 22, 1954, Serial No. 470,328

11 Claims. (Cl. 244—7)

This invention relates to aircraft capable of both horizontal and vertical flight, and more particularly to aircraft of this type in which the transition from horizontal to vertical flight and vice versa is accompanied by a right-angular change in the position of the craft.

The aircraft of this invention may be driven by propeller, jet or rocket propulsion or combinations of these; the specific types of propulsion shown, however, form no part of the invention and are not to be considered in a limiting sense but instead as illustrative of a form of the invention.

An object of the invention is to provide an improved aircraft of the type capable of both horizontal and vertical flight, having novel and effective means enabling it to easily and safely descend or alight in a substantially vertical direction, on a relatively small landing area.

Another object of the invention is to provide an improved aircraft as above set forth, which has an improved and reliable landing means in conjunction with the improved alighting means.

A further object of the invention is to provide a novel and improved aircraft in accordance with the above, which is capable of safely alighting on smooth or rough water as well as on land, without requiring any appreciable changes or modification.

Yet another object of the invention is to provide an improved aircraft as above characterized, wherein the means for facilitating its alighting and also supporting it in water is not an impediment to its flight in air.

A feature of the invention resides in the provision of an improved means for supporting an aircraft in water and for retarding the vertical speed of the aircraft in alighting, which is extendible from a storage to an operative position and occupies very little space when stored.

Another object of the invention is to provide an improved aircraft having novel decelerating means and landing gear in accordance with the above, which is of extremely simple and sturdy construction, foolproof in operation and economical to produce and manufacture.

Other features and advantages will hereinafter appear.

In the accompanying drawings:

Figure 1 is a side elevational view of the improved aircraft of this invention, in horizontal flight.

Fig. 2 is a top or plan view of the aircraft shown in Fig. 1.

Fig. 3 is a side elevational view of the aircraft being supported on the ground in vertical position after having alighted.

Fig. 4 is a fragmentary transverse sectional view taken on line 4—4 of Fig. 2.

Fig. 5 is a perspective view of the aircraft, showing the position and disposition of the various parts when descending vertically for a landing.

As shown, the improved aircraft of the present invention comprises a large wing-shaped body 10 having a snub nosed front or edge 11 and a slender rear edge 12. As shown in Fig. 2 the body 10 may be of generally rectangular configuration, with pilots' quarters 13 amidship and passenger quarters 14 disposed along the front edge 11.

As seen in Fig. 1 the body 10 is made thicker or higher immediately behind the leading or front edge 11 and gradually tapers according to a small acute angle, to converge at the narrow rear edge 12. The body 10 may have convergent side edges 15 and 16, and has expansive, oppositely disposed upper and lower surfaces 17 and 18 extending between the side edges 15, 16 and the front and rear edge 11, 12. A pair of pilot blisters 19 and 20 may be provided on the forward central portion of the body 10, as shown. Engine nacelles 22 may be provided on the front edge 11 of the body, for housing engines driving propellers 23, and jet engines 24 are shown as mounted on the sides of the body 10, to effect forward propulsion.

Referring to Fig. 1, jet engines 25 may also be mounted in the rear portion of the body 10 to exhaust at the rear edge 12 thereof, also to effect forward propulsion of the craft.

In accordance with the present invention I provide a novel and improved means for retarding the vertical landing speed of the aircraft shown in Figs. 1 and 2. This means comprises a pair of expansive wing members 27 and 28, adapted to overlie the major portions of the opposite expansive surfaces 17 and 18 respectively of the body 10. The wing sections 27 and 28 are hingedly connected to the forward portion of the body along transverse axes indicated at 30 and 31, and are adapted to fit closely to the body 10 for flight and to be pivotally movable away from the body about the said hinge connections for braking purposes when landing. As shown in Figs. 3 and 5 the wing members 27 and 28 are in their extended positions spaced from the body 10, said members being divergent in a downward direction and making small acute angles with the underlying expansive surfaces 17 and 18 of the body.

I provide power means for moving the wing members 27 and 28 between retracted and extended positions, said means comprising hydraulic pistons and cylinders 33, Fig. 3, pivotally connected to the body 10 and to the upper portions of the wing members 27 and 28.

It will be readily understood that when the aircraft is descending vertically and moving downward tail first, the wing members 27 and 28 when extended will act as an effective air brake means due to their large and expansive surfaces and will very appreciably decelerate the craft and provide, in conjunction with the forward motive means, an easily-controlled landing device.

To render the wing members 27 and 28 still more effective, and to enable the aircraft to be supported in water, I provide a plurality of flexible webs 35 adapted to extend between the side edges of the wing members 27, 28 and the body 10 when the members are extended, said webs constituting with the wing members large pockets having openings adjacent the rear edge of the body.

The webs 35 are preferably secured in an airtight manner to the side edges of the wing members 27, 28 and body 10, thereby to constitute airtight pockets of appreciable size. By the provision of the webs 35 the braking effect of the wing members 27, 28 is greatly enhanced, with the result that the downward speed of the aircraft when alighting is reduced to a relatively low value.

The above-described structure, in conjunction with the motive means of the aircraft, will thus enable the craft to alight safely and effortlessly in restricted landing areas. Moreover, by the provision of the webs 35 the aircraft may be landed on water, the pockets serving as huge pontoons which will readily support the craft.

In order to control the folding and extending of the webs 35 I provide rigid struts 37 pivoted to the body 10 at the points 38, the struts 37 being attached to central or median portions of the webs 35 and being controlled by hydraulic cylinders and pistons 39. By this arrangement the webs 35 may be folded flat into the smallest possible space between the wing members 27, 28 and the expansive sides of the body 10.

Referring to Figs. 1, 2 and 5 I provide on the wing member 27 a tail assembly 40 having a rudder 41, and the trailing edges of the wing members 27, 28 are provided with ailerons 42 for controlling the flight of the aircraft, the ailerons being movable either in the same directions or in opposite directions and also having utility when the aircraft is landed on rough water, since when they are oppositely extended virtually at right angles to the wing sections 27, 28, they act as baffles to stabilize the craft and minimize rocking or tossing thereof. By having pairs of upper and lower ailerons, banking and steering of the aircraft may also be easily accomplished.

The aircraft of this invention is of the type adapted to rise or descend vertically, and to fly horizontally or at various angles or inclinations. In order to cope with this condition I provide in the foremost portion of the body 10 a passenger and pilot deck 45 mounted on circular transverse supports 46 which are rotatable in circular tracks 47 by means of antifriction rollers 48. Thus the deck 45 carrying the passengers, crew, etc., may be at all times kept horizontal by suitable control apparatus (not shown).

By the present invention I provide a novel landing gear comprising sets of legs 50 disposed on opposite sides of the body 10 between the surfaces 17, 18 thereof and the wing sections 27 and 28, the legs of the sets being connected together adjacent their lower extremities by braces 51 and having wheels 52 for engagement with the ground. The legs 50 are pivotally mounted on the body 10 at the points 53 indicated in Fig. 2, and are operated by suitable cylinders and pistons 54, being automatically controlled so as to extend from the body 10 after the wing sections 27 and 28 have been extended, and to fold against the body 10 prior to folding of said wing sections.

Variations and modifications may be made within the scope of the claims and portions of the improvements may be used without others.

I claim:

1. An aircraft capable of both horizontal and vertical flight, comprising a wing having front and rear edges and oppositely disposed wing surfaces extending between said edges said wing at its forward portion being of sufficiently great dimension between the said oppositely-disposed surfaces to contain within it crew and passenger accommodations; a deck disposed within the forward portion of the body and extending along the front edge thereof; and means including an elongate tube surrounding the deck, mounting the latter for turning movement about a transverse axis substantially parallel to the front edge of the wing, said deck being at all times positionable substantially in a horizontal plane regardless of the front-to-rear tilt of the wing.

2. An aircraft capable of both horizontal and vertical flight, comprising a wing-shaped body having front and rear edges, and having oppositely-disposed surfaces extending between said edges, said body at its forward portion being of sufficiently great dimension between the said oppositely-disposed surfaces to contain within it crew and passenger accommodations; a pair of wing members overlying the major portions of the opposite surfaces of the body and hinged connections between said members and the forward portion of the body, said members being adapted to fit closely to the body for flight and being pivotally movable away from the body about the said hinged connections for braking purposes when descending vertically backward, in landing; power means for moving said wing members between retracted and extended positions close to the body and spaced therefrom respectively, said members when spaced from the body retarding backward vertical descent thereof; and landing gear means carried by the body for supporting the same on the ground in an upright position with its front edge uppermost, said landing gear means comprising legs mounted on the body and arranged to extend between the body and wing members when the latter are in extended positions.

3. An aircraft capable of both horizontal and vertical flight, comprising a wing-shaped body having front and rear edges, and having oppositely-disposed surfaces extending between said edges, said body at its forward portion being of sufficiently great dimension between the said oppositely-disposed surfaces to contain within it crew and passenger accommodations; a pair of wing members overlying the major portions of the opposite surfaces of the body and hinged connections between said members and the forward portion of the body, said members being adapted to fit closely to the body for flight and being pivotally movable away from the body about the said hinged connections for braking purposes when descending vertically backward, in landing; power means for moving said wing members between retracted and extended positions close to the body and spaced therefrom respectively, said members when spaced from the body retarding backward vertical descent thereof; and landing gear means carried by the body for supporting the same on the ground in an upright position with its front edge uppermost, said landing gear means comprising legs mounted on the body and arranged to extend between the body and wing members when the latter are in extended positions, said legs being pivoted on the body adjacent the pivotal axis of the wing members.

4. An aircraft capable of both horizontal and vertical flight, comprising a wing-shaped body having front and rear edges, and having oppositely-disposed surfaces extending between said edges, said body at its forward portion being of sufficiently great dimension between the said oppositely-disposed surfaces to contain within it crew and passenger accommodations; a pair of wing members overlying the major portions of the opposite surfaces of the body and hinged connections between said members and the forward portion of the body, said members being adapted to fit closely to the body for flight and being pivotally movable away from the body about the said hinged connections for braking purposes when descending vertically backward, in landing; power means for moving said wing members between retracted and extended positions close to the body and spaced therefrom respectively, said members when spaced from the body retarding backward vertical descent thereof; landing gear means carried by the body for supporting the same on the ground in an upright position with its front edge uppermost; and a rudder mounted on one of the wing members adjacent the rear edge thereof and movable with said wing member.

5. An aircraft capable of both horizontal and vertical flight, comprising a wing-shaped body having front and rear edges, and having oppositely-disposed surfaces extending between said edges, said body at its forward portion being of sufficiently great dimension between the said oppositely-disposed surfaces to contain within it crew and passenger accommodations; a pair of wing members overlying the major portions of the opposite surfaces of the body and hinged connections between said members and the forward portion of the body, said members being adapted to fit closely to the body for flight and being pivotally movable away from the body about the said hinged connections for braking purposes when descending vertically backward, in landing; power means for moving said wing members between retracted and extended positions close to the body and spaced therefrom respectively, said members when spaced from the body retarding backward vertical descent thereof;

landing gear means carried by the body for supporting the same on the ground in an upright position with its front edge uppermost; and an aileron mounted on the rear edge of one of the wing members.

6. An aircraft capable of both horizontal and vertical flight, comprising a wing-shaped body having front and rear edges, and having oppositely-disposed surfaces extending between said edges, said body at its forward portion being of sufficiently great dimension between the said oppositely-disposed surfaces to contain within it crew and passenger accommodations; a pair of wing members overlying the major portions of the opposite surfaces of the body and hinged connections between said members and the forward portion of the body, said members being adapted to fit closely to the body for flight and being pivotally movable away from the body about the said hinged connections for braking purposes when descending vertically backward, in landing; power means for moving said wing members between retracted and extended positions close to the body and spaced therefrom respectively, said members when spaced from the body retarding backward vertical descend thereof; landing gear means carried by the body for supporting the same on the ground in an upright position with its front edge uppermost; and ailerons on the rear edges of both wing members.

7. An aircraft capable of both horizontal and vertical flight, comprising a wing-shaped body having front and rear edges, and having oppositely-disposed surfaces extending between said edges, said body at its forward portion being of sufficiently great dimension between the said oppositely-disposed surfaces to contain within it crew and passenger accommodations; a pair of wing members overlying the major portions of the opposite surfaces of the body and hinged connections between said members and the forward portion of the body, said members being adapted to fit closely to the body for flight and being pivotally movable away from the body about the said hinged connections for braking purposes when descending vertically backward, in landing; power means for moving said wing members between retracted and extended positions close to the body and spaced therefrom respectively, said members when spaced from the body retarding backward vertical descend thereof; landing gear means carried by the body for supporting the same on the ground in an upright position with its front edge uppermost; means extending from the wing-shaped body to the side edges of the wing members when the latter are extended, constituting with said wing members pockets having openings adjacent the rear edge of the body, said means constituting pockets comprising foldable web sections; rigid struts connected to the web sections; and power means for actuating the struts.

8. An aircraft capable of both horizontal and vertical flight, comprising a wing-shaped body having front and rear edges, and having oppositely-disposed surfaces extending between said edges, said body at its forward portion being of sufficiently great dimension between the said oppositely-disposed surfaces to contain within it crew and passenger accommodations; a pair of wing members overlying the major portions of the opposite surfaces of the body and hinged connections between said members and the forward portion of the body, said members being adapted to fit closely to the body for flight and being pivotally movable away from the body about the said hinged connections for braking purposes when descending vertically backward, in landing; power means for moving said wing members between retracted and extended positions close to the body and spaced therefrom respectively, said members when spaced from the body retarding backward vertical descend thereof; landing gear means carried by the body for supporting the same on the ground in an upright position with its front edge uppermost; means extending from the wing-shaped body to the side edges of the wing members when the latter are extended, constituting with said wing members pockets having openings adjacent the rear edge of the body, said means constituting pockets comprising foldable web sections; rigid struts connected to the web sections; and power means for actuating the struts, said struts being connected to the center portions of the webs and pivoted on forward portions of the body.

9. An aircraft capable of both horizontal and vertical flight, comprising a wing having front and rear edges, and having oppositely-disposed wing surfaces extending between said edges, said wing at its forward portion being of sufficiently great dimension between the said oppositely-disposed surfaces to contain within it crew and passenger accommodations; a pair of wing members overlying the major portions of the opposite wing surfaces of the wing; hinge means for pivotally connecting said wing members to the forward portion of the wing, said members being adapted to fit closely to the wing for flight and being pivotally movable away from the wing about the said hinge means for braking purposes when descending vertically backward, in landing; power means for moving said wing members between retracted and extended positions close to the wing and spaced therefrom respectively, said members when spaced from the wing retarding backward vertical descent thereof; landing gear means carried by the wing for supporting the same on the ground in an upright position with its front edge uppermost; and means extending from the wing to the side edges of the wing members when the latter are extended, constituting with said wing members pockets having openings adjacent the rear edge of the wing, said means which constitute the pockets comprising web sections connected to side edges of the wing, said web sections being sealed to the wing and to the wing members to provide airtight pockets adapted to function as pontoons for sustaining the aircraft in water, and said landing gear means comprising legs mounted on the wing and arranged to extend between the wing and wing members when the latter are in extended positions, said legs being disposed in the said pockets.

10. An aircraft capable of both horizontal and vertical flight, comprising a wing having front and rear edges, and having oppositely-disposed wing surfaces extending between said edges, said wing at its forward portion being of sufficiently great dimension between the said oppositely-disposed surfaces to contain within it crew and passenger accommodations; a pair of wing members overlying the major portions of the opposite wing surfaces of the wing; hinge means carried by the wing at the said opposite surfaces thereof and disposed forward of the front-to-rear center of the wing for hingedly connecting said wing members to the forward portion of the wing, said members being adapted to fit closely to the wing for flight and being pivotally movable away from the wing about the said hinge means for braking purposes when descending vertically backward, in landing; power means for moving said wing members between retracted and extended positions close to the wing and spaced therefrom respectively, said members when spaced from the wing retarding backward vertical descent thereof; landing gear means carried by the wing for supporting the same on the ground in an upright position with its front edge uppermost; and means extending from the wing to the side edges of the wing members when the latter are extended, constituting with said wing members pockets having openings adjacent the rear edge of the wing, said last named means constituting pockets comprising web sections connected to side edges of the wing, said web sections being sealed to the wing and wing members to provide airtight pockets adapted to function as pontoons for sustaining the aircraft in water.

11. An aircraft capable of both horizontal and vertical flight, comprising a wing having front and rear edges, and having oppositely-disposed wing surfaces extending between said edges, said wing at its forward portion being of sufficiently great dimension between the said oppositely-disposed surfaces to contain within it crew and passenger accommodations; a pair of wing members overlying the major portions of the opposite wing surfaces of the said wing; hinge means carried by the wing at the said opposite surfaces thereof and disposed forward of the front-to-rear center of the wing for pivotally connecting said wing members to the forward portion of the wing, said members being adapted to fit closely to the wing for flight and being pivotally movable away from the wing about the said hinge means for braking purposes when descending vertically backward, in landing; power means for moving said wing members between retracted and extended positions close to the wing and spaced therefrom respectively, said members when spaced from the wing retarding backward vertical descent thereof; landing gear means carried by the wing for supporting the same on the ground in an upright position with its front edge uppermost; and propellent means carried at the side edges of the wing on the forward portion thereof.

References Cited in the file of this patent

UNITED STATES PATENTS

| | | |
|---|---|---|
| 224,232 | Schrader | Feb. 3, 1880 |
| 2,481,379 | Zimmerman | Sept. 6, 1949 |
| 2,668,026 | Price | Feb. 2, 1954 |

FOREIGN PATENTS

| | | |
|---|---|---|
| 256,757 | Switzerland | Aug. 31, 1948 |
| 368,727 | Italy | Mar. 1, 1939 |
| 862,921 | France | Dec. 23, 1940 |